(12) United States Patent
Ellement (10) Patent No.: US 9,238,941 B2
(45) Date of Patent: Jan. 19, 2016

(54) VEHICLE ACCESS SYSTEM

(75) Inventor: Nathan John Ellement, Oakford (AU)

(73) Assignee: Barjoh Pty Ltd, Oakford, W.A. (AU)

( * ) Notice: Subject to any disclaimer, the term of this patent is extended or adjusted under 35 U.S.C. 154(b) by 1060 days.

(21) Appl. No.: 11/917,701

(22) PCT Filed: Jun. 16, 2006

(86) PCT No.: PCT/AU2006/000846
§ 371 (c)(1),
(2), (4) Date: May 23, 2008

(87) PCT Pub. No.: WO2006/133513
PCT Pub. Date: Dec. 21, 2006

(65) Prior Publication Data
US 2009/0038885 A1    Feb. 12, 2009

(30) Foreign Application Priority Data
Jun. 16, 2005    (AU) ................................. 2005903162

(51) Int. Cl.
*E06C 5/04*    (2006.01)
*E06C 5/06*    (2006.01)
*B60R 3/02*    (2006.01)

(52) U.S. Cl.
CPC .... *E06C 5/06* (2013.01); *B60R 3/02* (2013.01)

(58) Field of Classification Search
CPC .............. B60R 3/00; E06C 5/16; E06C 5/10; E06C 5/06

USPC ................. 182/127, 97, 85, 86; 280/163, 166
See application file for complete search history.

(56) References Cited

U.S. PATENT DOCUMENTS

| | | | | |
|---|---|---|---|---|
| 3,528,574 A * | 9/1970 | Denner et al. | ................ | 414/558 |
| 3,790,981 A * | 2/1974 | Young | ................................. | 15/87 |
| 3,882,963 A * | 5/1975 | Ashworth | ...................... | 182/2.5 |
| 4,014,486 A * | 3/1977 | Nelson et al. | .............. | 244/129.6 |
| 4,243,120 A | 1/1981 | Pratt, Jr. et al. | | |
| 5,033,582 A | 7/1991 | Hoben | | |
| 5,201,494 A * | 4/1993 | Lundman | ...................... | 254/8 B |
| 5,339,919 A * | 8/1994 | Boyd | .............................. | 182/85 |
| 5,439,342 A * | 8/1995 | Hall et al. | ..................... | 414/545 |
| 5,518,357 A * | 5/1996 | Ziaylek | ......................... | 414/462 |
| 5,813,494 A | 9/1998 | Ulschmid et al. | | |
| 5,842,709 A * | 12/1998 | Maccabee | ..................... | 280/166 |
| 6,347,686 B1 * | 2/2002 | Hedley et al. | ................... | 182/86 |
| 7,905,324 B2 * | 3/2011 | Gil et al. | ....................... | 182/127 |

* cited by examiner

*Primary Examiner* — Alvin Chin-Shue
(74) *Attorney, Agent, or Firm* — Crawford Maunu PLLC (57) ABSTRACT

A vehicle access system and method with retractable access means (10) e.g. ladder or stairs and a retracting mechanism (25) therefor. Force applied to the access means is sufficient to retract the access means from a fully deployed position to a partially retracted position but not sufficient to not be physically resisted by a user during at least part of the retraction. With the access means in a fully retracted position, force exerted on the retracted access means can be sufficient to hold the access means in a retracted position without the need for auxiliary restraining means.

21 Claims, 9 Drawing Sheets

VEHICLE ACCESS SYSTEM

RELATED PATENT DOCUMENTS

This patent application is the national stage filing under 35 U.S.C. §371 of International Application No. PCT/AU2006/000846 filed on Jun. 16, 2006; which claims foreign priority benefit under 35 U.S.C. §119/365 of Australian Patent Application No. 2005903162 filed on Jun. 16, 2005, both of which are incorporated herein by reference.

FIELD OF THE INVENTION

This invention relates to access systems for vehicles, specifically the access system for large earth moving equipment.

BACKGROUND OF THE INVENTION

Access systems for large earth moving equipment often incorporate a set of deployable stairs so that the operator can climb up into the cab without climbing a vertical ladder that may have a negative inclination if the equipment is not parked on level ground.

Once the operator is on the machine the operator retracts the stairs so that they are not hanging down and the ground clearance of the machine is increased thus minimizing the probability of the stairs being damaged by contacting rocks when the machine is in motion.

The stairs need to be retracted so that other personnel cannot climb up onto the machine without the operator's knowledge. Should a person be on the stairs without the operator's knowledge then the possibilities for injury to that person are numerous. The possible injuries could range from overbalancing the person to crushing or trapping the person between the moving parts of the equipment and the adjoining bodywork of the equipment.

The systems used for retracting the stairs can vary but generally they rely on either an electric or hydraulic system that is manually actuated by the operator.

Should an emergency occur such as a fire it is necessary for the operator to activate a switch to lower the stairs to evacuate the machine or find an alternative way off the machine or equipment. This can be a particular problem if there is a fire in the vicinity of the stair operating switch.

Should the operator forget to retract the stairs and drive the machine off, it is possible to destroy the stairs, causing an expensive repair, downtime and generating safety issues, resulting from damage to an emergency exit.

Another known problem of prior art ladder retraction systems is that, when retracted, the ladder is either held retracted by hydraulic/pneumatic pressure, such as provided by the lifting cylinder, or once retracted a locking pin is used to lock the ladder in place. The locking pin itself can be driven by a small hydraulic/pneumatic cylinder.

Problems with such systems are typically associated with bounce. The ladder can bounce during movement of the vehicle, causing failure of the lifting system. Also, damage caused to the locking pin by ladder bounce can result in failure of the locking pin mechanism.

Where the vehicle has an interlock system, such as a proximity switch, connected to the ladder retraction mechanism or to the locking pin actuating mechanism to prevent movement or starting the vehicle until the interlock is operated, ladder bounce can result in the switch operating thereby stopping or shutting down the vehicle unexpectedly. This results in excess downtime of the vehicle and loss of productivity.

With the aforementioned in mind, it is an object of the present invention to provide a system for retracting a ladder that allows a user to physically halt initial retraction but provides sufficient force to maintain the ladder retracted when retracted.

SUMMARY OF THE INVENTION

With this in view, there is provided a vehicle access system including an access means and a retracting mechanism for the access means, wherein a force applied to the access means is sufficient to retract the access means from a fully deployed position to a partially retracted position but not sufficient to not be physically resisted by a user during at least part of the retraction.

Thus, advantageously, an access system for a vehicle is provided that will allow a user to overcome the retraction forces during at least part of the retraction process to thus prevent further retraction, and optionally commence re-deployment of the stairs to alleviate risk of injury to the user. It will be appreciated that a user wishing to prevent retraction of the stairs will be able to safely apply sufficient force or weight to overcome retraction forces and thus halt or reverse the retraction process.

It will be appreciated that the term access means may encompass stairs, steps and ladders for accessing vehicles.

A further aspect of the present invention provides a retractable access system for a vehicle including an access means and a retracting mechanism for said access means, wherein an applied moving force is translated into a variable force for retracting the access means wherein torque generated to retract the access means exceeds torque required to retract the access means by an amount that is able to be resisted by a user for a portion of the retraction phase and increases to a greater force for a latter portion of the retraction phase.

Preferably, when the access means is fully retracted, a force may be exerted on the retracted access means sufficient to hold the access means in a retracted position without the need for auxiliary restraining means.

Preferably torque provided to retract the access means may vary through at least part of the retraction cycle.

The torque generated may vary throughout the retraction cycle so that the torque provided to retract the access means from 0-70% of the retraction cycle just exceeds the required torque necessary to retract the access means, and between 70-100% of the retraction cycle the torque generated may increase such that when the access means is fully retracted the torque applied to the access means is sufficient to hold the access means in the retracted position without the need for auxiliary restraining means.

This provides the advantage that when the access means are within reach or use of ground personnel, the forces retracting the access means may be countered by the user. When the access means are out of the reach of ground personnel, the force applied through the retraction mechanism increases so that the access means are firmly held in the retracted position.

Preferably the retracting/deploying system may be connected into a hydraulic pilot control circuit and/or a hand brake hydraulic circuit of the vehicle. This has the advantage that when the hand brake is released the access means are automatically retracted. When the park brake is applied or if there is a hydraulic failure the access means are deployed.

The geometry of the parts of the linkage is configured to provide a required torque profile.

A further aspect of the present invention provides a method of retracting an access means including the steps of;

a) applying a first lifting force during an initial portion of a retraction phase of a deployed access means, the applied first lifting force being equal to or greater than a minimum force required to lift the access means, and b) subsequently applying a second lifting force during a secondary portion of the retraction phase of the deployed access means, the second lifting force being greater than the minimum required to lift the ladder.

Preferably the first lifting force may be less than a manual effort required to retard retraction of the access means. Preferably the manual effort may be sufficient to reverse retraction of the access means and commence re-deployment thereof.

Preferably the second lifting force (torque) may diverge (and increase) compared to the required lifting force during the secondary portion of the retraction phase.

Preferably the initial portion of the retraction phase may be about two thirds of the entire retraction phase from commencement to fully retracted.

DETAILED DESCRIPTION

It will be convenient to describe the present invention with reference to the accompanying Figures and examples that illustrate possible arrangements of the present invention.

Figure 1:
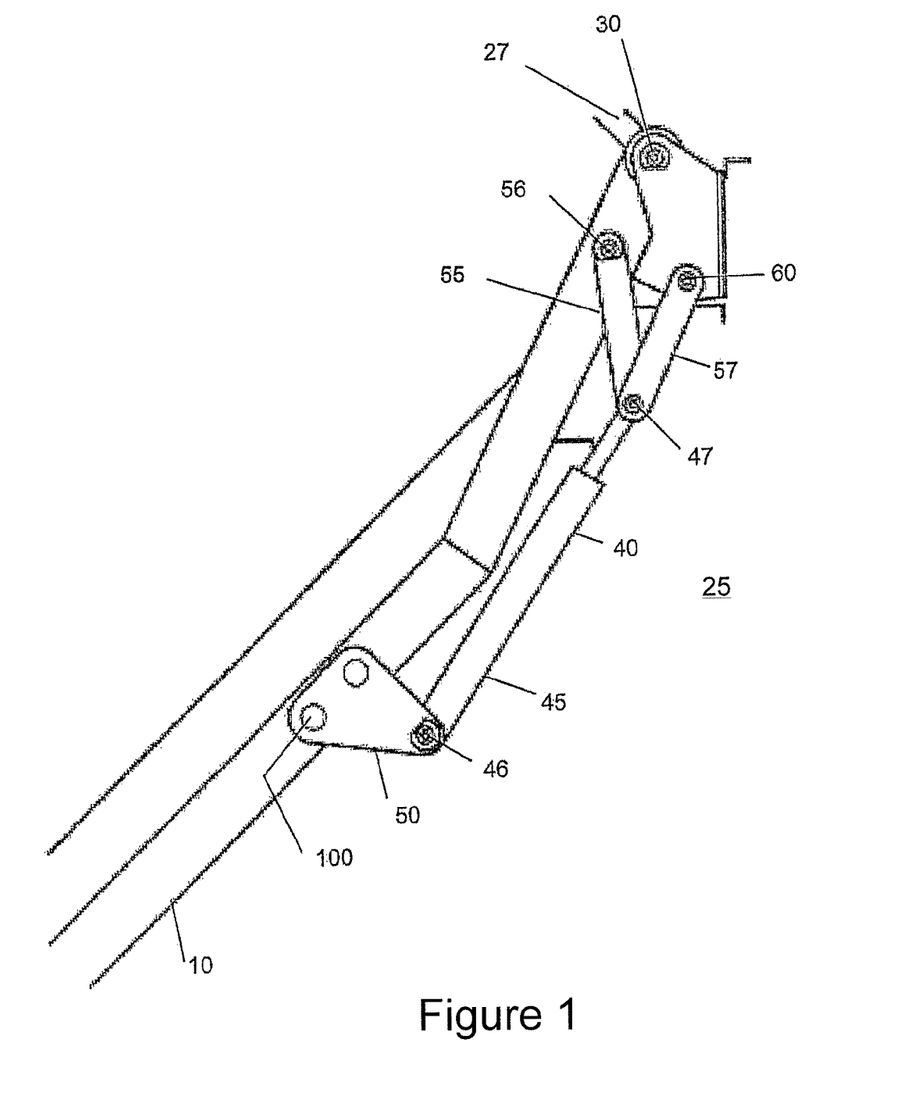
FIG. 1 is a side view of an embodiment of the present invention showing the mechanical arrangement of the retracting mechanism.

FIG. 1 shows a preferred embodiment where the stairs 10 operate with rotation around a fixed point at the inboard end of the stairs 10. It would be clear to a person skilled in the art that other possible arrangements are possible.

The access system consists of a set of access stairs 10 actuated by a retraction mechanism 25.

The stairs 10 are relatively conventional for large earth-moving equipment and may have a normal operating angle of between 45° and 70° relative to the horizontal direction and retract through an arc of between 90° and 180°. The stairs 10 may also include a hand rail 27 and textured treads (not shown) to provide a secure access way to the equipment.

The retraction mechanism 25 has been chosen to provide a unique non linear torque response to the stairs 10 from a fixed force linear output. In the present example the linear force is provided by a hydraulic ram 40. The retraction mechanism 25 is optimized to provide a varying torque to lift the stairs 10 depending on where in the arc of retraction the stairs 10 are. When the stairs 10 are in the fully deployed position such that an operator could use the stairs 10 to access the equipment the torque force applied to retract the stairs 10 is enough to raise the stairs 10, however the torque applied only exceeds the torque required by a relatively small amount so that a person would be able to stop the stairs 10 from retracting. This has the advantage that should a person be on the stairs 10 or holding the stairs 10 when they are retracted by the equipment operator, the stairs 10 will not retract and injure the person holding the stairs 10.

Once the stairs 10 are retracted above the reach of any ground personnel or equipment that may get caught up with the stairs 10, the torque applied to the stairs 10 is increased relative to the torque required. The point of increasing torque is set by the geometry of the retraction mechanism 25. The point of increasing torque is determined during design of the retraction mechanism 25 and may vary according to the intended application. For example a small earth moving machine or equipment may have the stair travel through 70° before the stairs 10 are out of reach of ground personnel and therefore may be designed to have the torque increase at about this point. If the stairs 10 are being fitted to a larger machine the stairs 10 may only need to be retracted through 45° or even less before they are out of reach of ground personnel.

The increase of torque applied to the stairs 10 provides an advantage in that by the time the stairs 10 are in the fully retracted position there is a larger force holding the stairs 10 in the fully retracted position. This increased force applied to the stairs 10 eliminates the need for any additional retention mechanisms to be installed to stop the stairs 10 moving uncontrollably when the equipment is in operation.

Another advantage of the retraction mechanism 25 is that should the stairs 10 be restrained, by contact with fixed objects, for example rocks or other vehicles, the retraction mechanism 25 will not be damaged as the torsional force available to retract the stairs 10 is initially not significantly greater than the force required in retracting the stairs 10.

FIG. 1 shows a general arrangement of the retraction mechanism 25. The stairs 10 are pivotally mounted to the equipment at the stair main pivot 30. The retraction mechanism 25 includes a hydraulic ram 40, having a first end 45 pivotally connected to a hydraulic ram 40 via mounting bracket 50 at the hydraulic ram pivot 46. The hydraulic ram bracket 50 is affixed to the stair 10 at some distance along the stair 10 remote from the stair main pivot 30 that is located on the earth moving equipment (not shown). The hydraulic ram bracket 50 is designed to move the hydraulic ram pivot some distance from the stair 10. This distance is called the hydraulic ram offset 100.

The second end 47 of the hydraulic ram 40 is pivotally connected to two linkages. One of the linkages is called the ram stair linkage 55. The ram stair linkage 55 runs from the second end 47 of the hydraulic ram 40 to the intermediate pivot 56 located on the stairs 10 at a point between the main pivot 30 and the hydraulic ram mounting bracket 50.

The second linkage connected to the second end 47 of the hydraulic ram 40 is called the ram body linkage 57. The ram body linkage 57 runs from the second end 47 of the hydraulic ram 40 to the body pivot point 60 located on the earth moving equipment at some point offset from the stair main pivot 30.

When in operation the hydraulic ram 40 extends and applies a force between the ram pivot 46 and the equipment through the ram body linkage 57. As the ram pivot 46 is offset by the use of the hydraulic ram mounting bracket 50 (the hydraulic ram offset 100) and the ram body linkage 47 is mounted on the earth moving equipment at the body pivot 60 (offset from the main pivot 30) the force generated by the extending hydraulic cylinder 40 is converted to a torque applied to the stair 10 around the stair main pivot 30.

The force applied by the hydraulic ram 40 may be adjusted so that when the stairs 10 are in a fully deployed position and an operator would use the stairs 10. The forces applied through the hydraulic ram 40 and translated into torque are sufficient to counteract the weight of the stairs 10 so that the stairs 10 can be retracted. The torque forces are however not high enough to lift a person, the stairs 10 may even be stopped from raising by being held by a person. Once the arc of retraction has progressed so that the stairs 10 are not within reach of ground personnel the torque applied increases so that once the stairs 10 are fully retracted the torque applied to the stairs 10 is sufficient to hold the stairs 10 in the fully retracted position and prevent them moving when the earth moving equipment is in operation.

Figure 2:
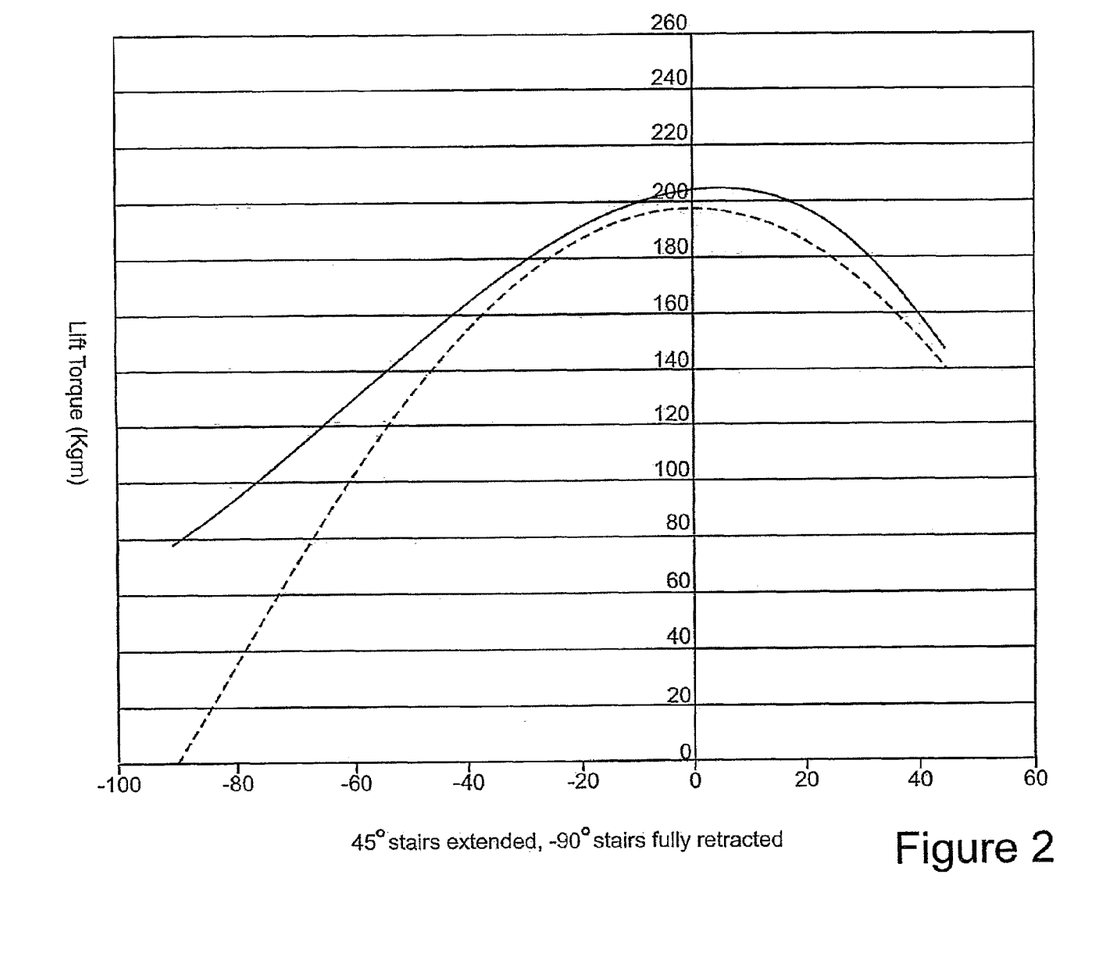
FIG. 2 is a graph showing the torque required and the torque applied to retract the stair from +45° to −90° according to an embodiment of the present invention.

FIG. 2 shows a typical force profile for a set of stairs 10 operating in the +45° to −90° arc. In this graph the dotted line shows the torque required to raise the stairs 10 while the solid line represents the torque applied. It can be seen that through the arc of +45° to −70° the torque supplied is in excess of the torque required to raise the stairs 10 by approximately 10-20 kgm. When the stair 10 are in the fully retracted position the force required to overcome the tortional force provided through the retraction mechanism 25 is approximately 80 kgm. These values may be changed by adjusting the force output of the hydraulic ram 40.

Figure 3:
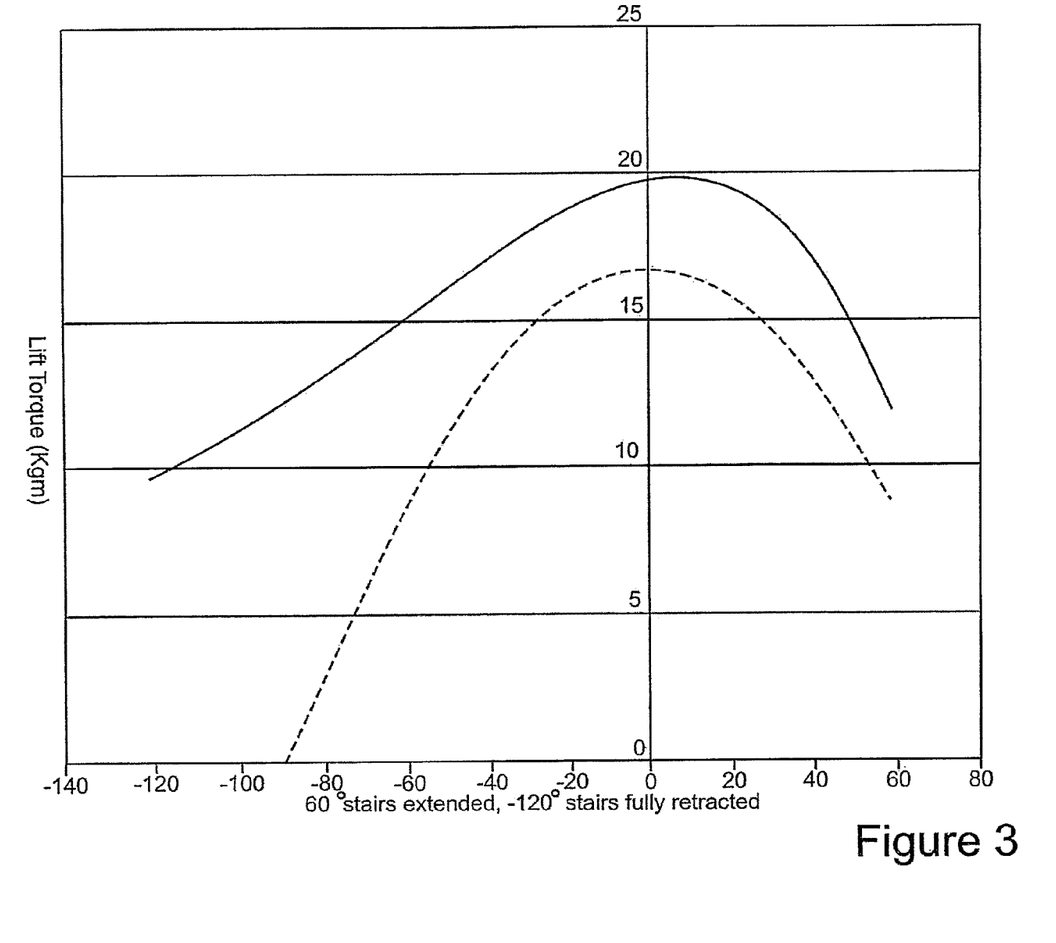
FIG. 3 is a graph showing the torque required and the torque applied to retract the stair from +60° to −120° according to an embodiment of the present invention.

FIG. 3 shows a typical force profile for a set of stairs operating in the +60° to −120° arc. In this graph the dotted line shows the torque required to raise the access stairs 10 while the solid line represents the force applied to the stairs 10. It can be seen that through the arc of +60° to −60° the torque supplied in excess of the torque required is approximately 5 kgm. When the stairs 10 is in the fully retracted position the force required to overcome the hydraulic force is substantially more.

In general the retraction mechanism 25 is set up so that with a constant output from a hydraulic ram 40 the torsion forces applied to the stairs 10 exceed the forces required to lift the stairs 10 for approximately ⅔ of the arc. In the last third of the arc approaching the fully retracted position the induced torque force increases so that the stairs 10 are firmly held in the retracted position and doesn't move excessively while the equipment is in operation.

Examples of the retraction mechanism 25 are given in Table 1 . . .

TABLE 1

| Description | Dimension 45° C. to 90° C. | Dimension 60° C.-120° C. |
| --- | --- | --- |
| Stair main pivot 30 to extreme end (not shown) | 2000 mm | 700 mm |
| Hydraulic Ram Offset 100 | 100 mm | 200 mm |
| Hydraulic Ram mounting bracket 50 to stair main pivot 30 | 1030 mm | 550 mm |
| Ram stair linkage 55 (pivot centre to pivot centre) | 255 mm | 150 mm |
| Ram body linkage 57 (pivot centre to pivot centre) | 220 mm | 150 mm |
| Distance from stair pivot 56 to main pivot 30 | 160 mm | 50 mm |
| Stair main pivot to body pivot 60 | 200 mm | 65 mm |

The control for the hydraulic ram 40 of the retraction mechanism 25 may be operated through the pilot circuit for the park brakes on rubber tyred equipment or the pilot circuit for the controls on tracked equipment. In large earth moving equipment the park brakes are normally on and hydraulic pressure is used to release the brakes. Alternately the hydraulic pressure for the retraction mechanism 25 may be provided by the main hydraulic system or from a separate hydraulic pump.

Figure 4:
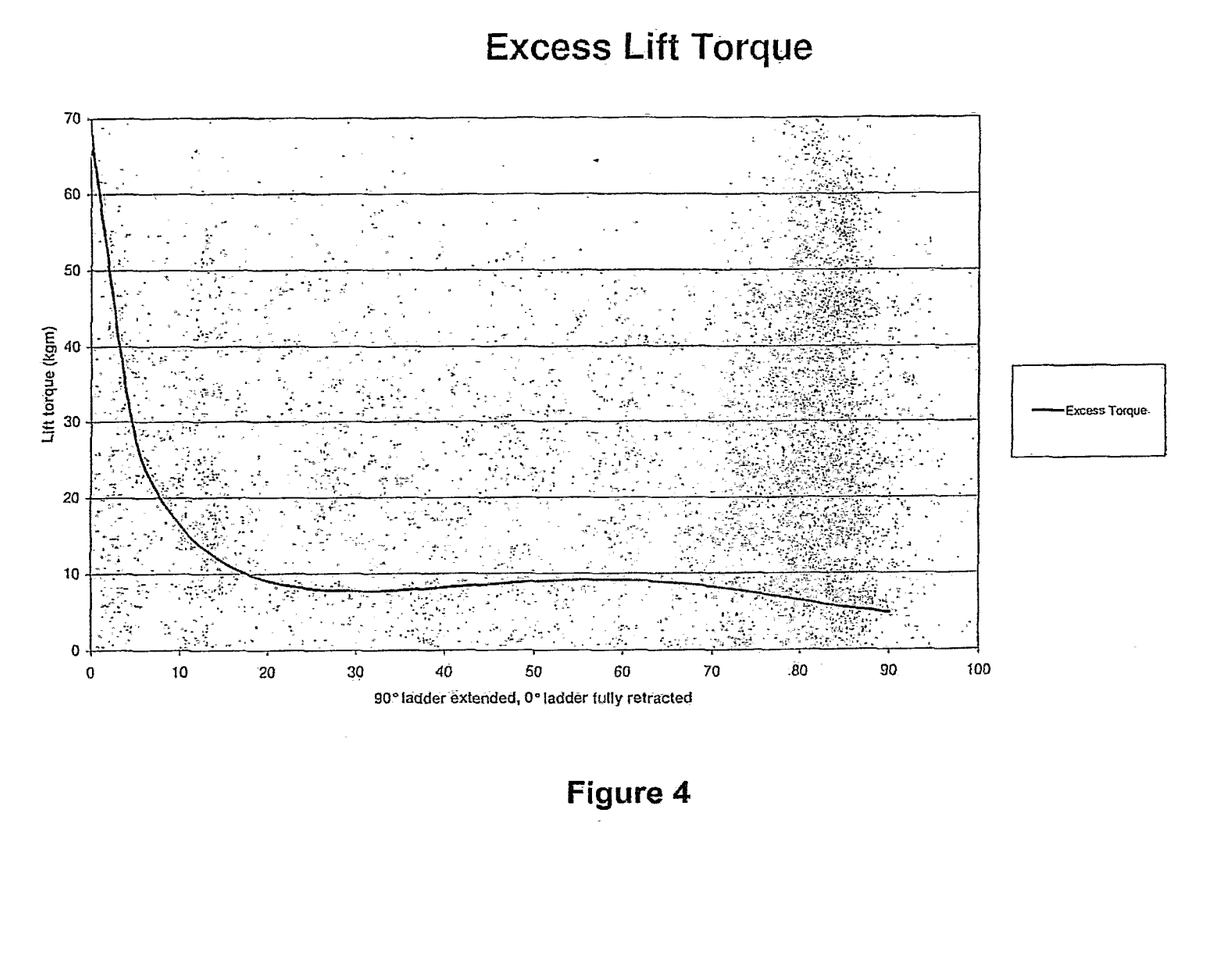
FIG. 4 shows a graph of excess lift torque for a ladder retracting through 90° in accordance with an embodiment of the present invention.

The graph in FIG. 4 depicts excess lift torque for a vehicle ladder or stairs retracting through 90° e.g. from near vertical when deployed to near horizontal when fully retracted. The graph plots Lift torque (kgm) over and above the torque required to commence lifting the ladder against the degrees of extension of the ladder. That is, for example, a graph of the difference between the dotted line and the solid line shown in each of FIGS. 2 and 3.

In the embodiment shown, excess lift torque is minimal for initial lift (retraction) (right hand portion of curve) and thereafter increases once the ladder has retracted sufficiently that a user or personnel is either not in danger of injury, or the ladder is considered sufficiently retracted that the user has had sufficient warning of retraction or the ladder is out of reach.

It may be appreciated that although ideally the excess lift torque would be linear or near linear i.e. a straight line prior to the increase portion of the graph, physical, mechanical and force characteristics of the system approximate or approach the ideal, which is sufficient to provide an effective and efficient working system without requiring over-engineering or more complex configurations.

Figure 5:
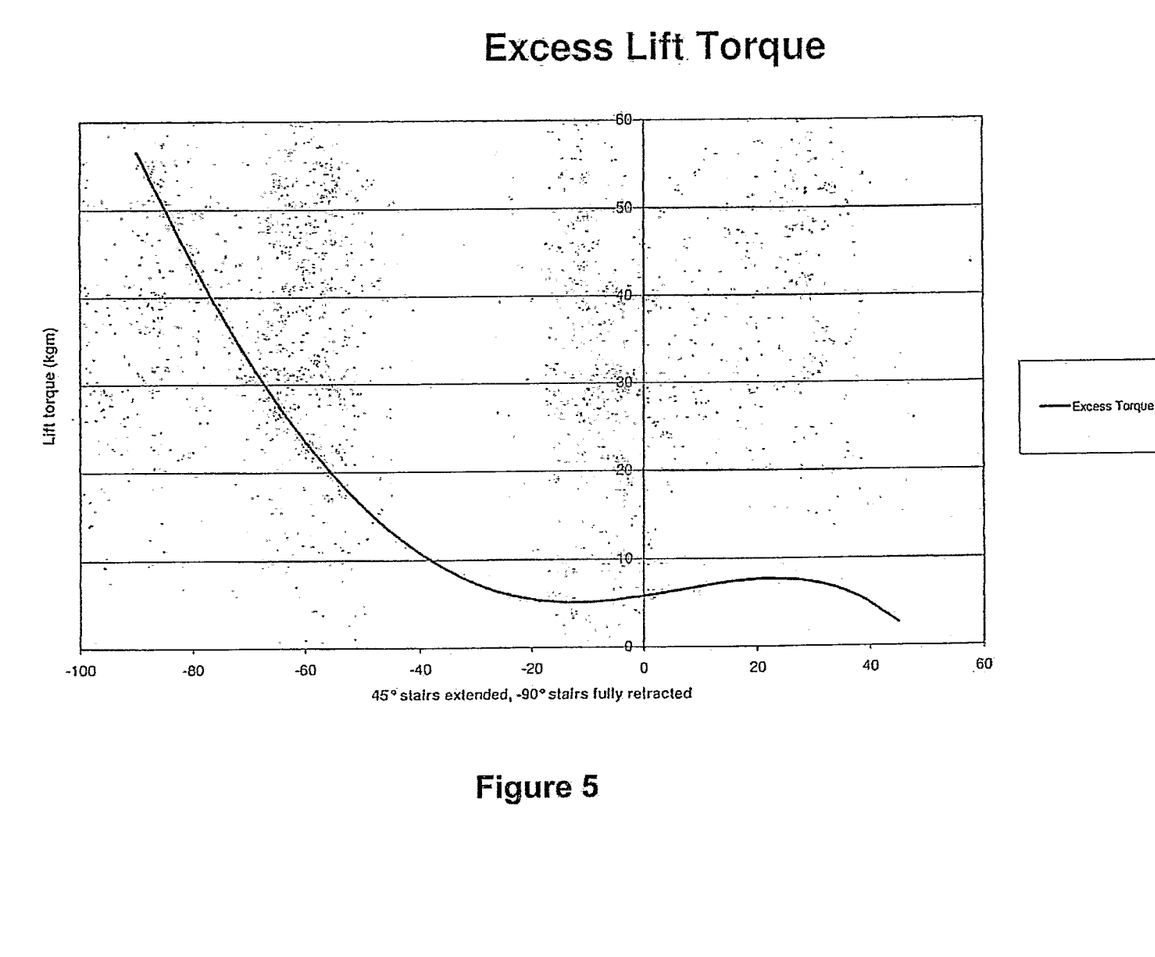
FIG. 5 shows a graph of excess lift torque for a ladder retracting from 45° extended to −90° retracted, according to an embodiment of the present invention.

FIG. 5 shows an alternative excess lift torque curve being for a ladder retracting from 45° angle of extension (from the horizontal) to −90° retracted (vertical). Again, ideally the right hand portion of the graph (before the steep sloped section) would be linear.

It will be appreciated that the nearer the generated torque (solid line in FIGS. 2 and 3) is to the required lift torque in the right hand side of each graph across the range of angles, the less manual force is required to halt retraction of the ladder. Also, in the left hand (steep) section of the graph, the more the solid (applied force) line deviates away from and above the dotted line, the greater the force (torque) applied, and the greater the holding force can be when the ladder is fully retracted. Thus, for the first approximately two thirds of the retraction process, the difference between required and applied torque can be minimal, though applied should not be less than the required torque, the easier a person can manually stopped retraction (lift) of the ladder. However, once the ladder has approximately one third retraction travel to go, lift force (torque) can be significantly increased, thus speeding up retraction and also providing sufficient force to maintain the ladder retracted without needing additional restraining means such as a locking pin mechanism (though such can be provided if required).

Figure 6A:
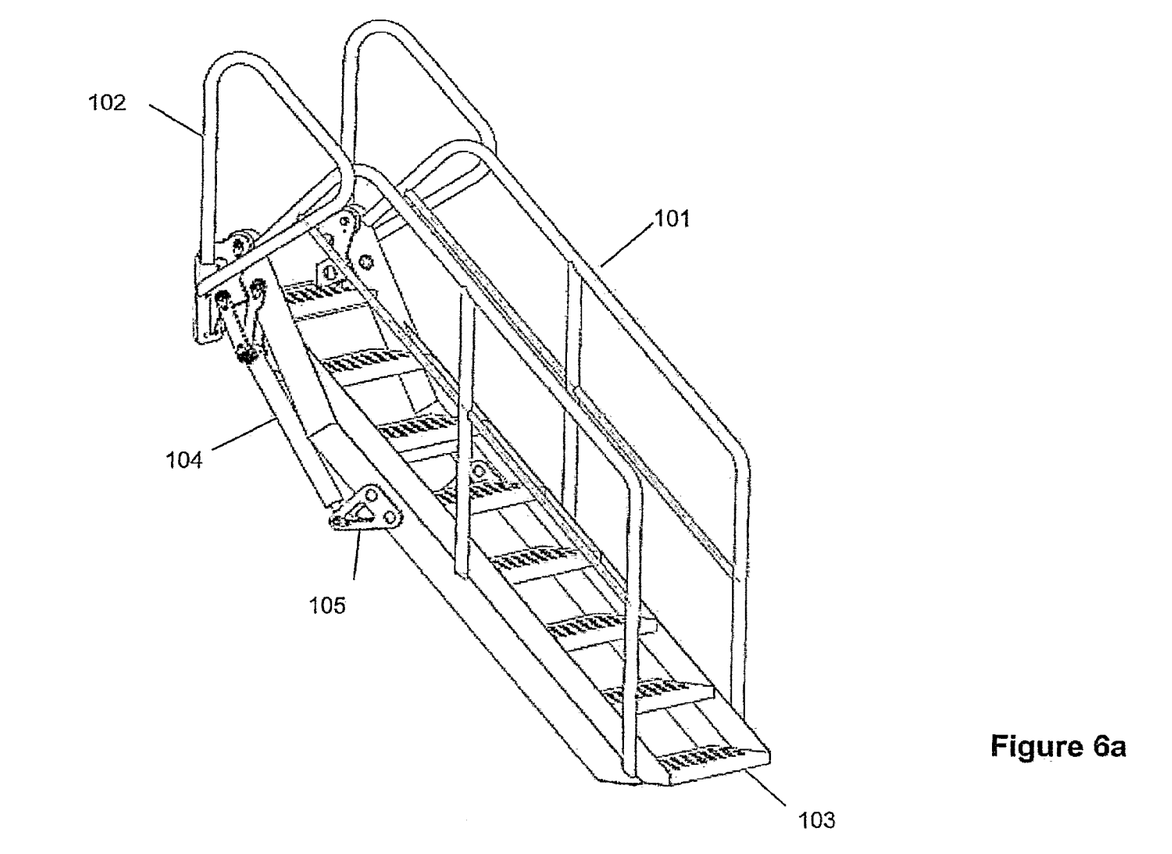
FIGS. 6a to 6d show a series of images of a set of vehicle stairs being retracted from a deployed position to a fully retracted position according to an embodiment of the present invention.
Figure 6B:
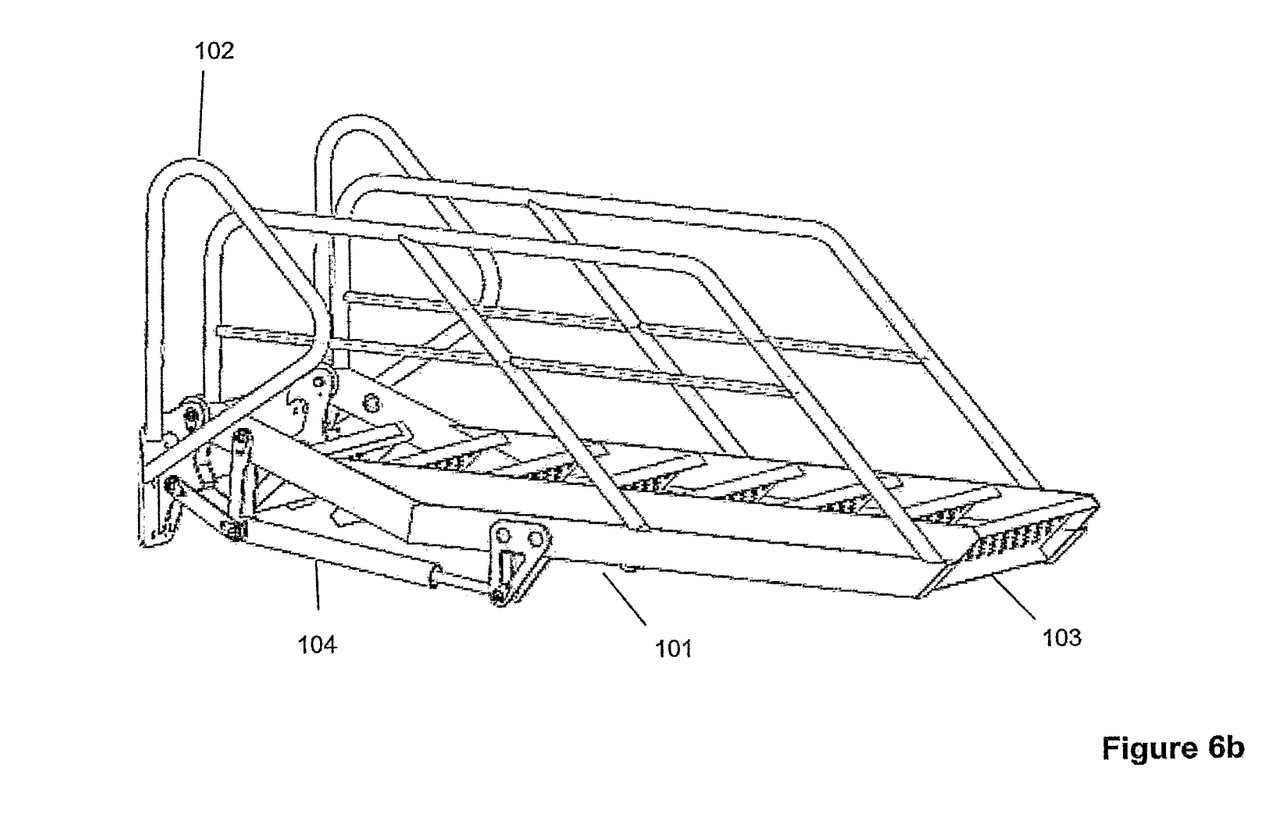

FIGS. 6a to 6d show a series of steps in the retraction process. FIG. 6a shows the steps 101 fully extended (approx 450 from horizontal). The upper end 102 would normally be mounted to a vehicle (not shown). The steps are pivoted to a retracted position, with deployment being the reverse of retraction, though if required, the force curve for deployment may differ from the force curve for retraction. FIG. 6b shows the steps approximately one third through the retraction process. The lower end 103 is almost horizontal with the upper end 102. It will be appreciated that the steps or ladders etc. may take various forms and arrangements e.g. pivoted in the middle so as to also collapse to a shorter retracted form. Also the steps or ladders may retract sideways e.g. pivot sideways. However, the force curve nature of retraction according to the present invention remains the same.

Lifting force is provided via an actuating cylinder 104 applying force between a linkage at the upper end of the steps and a connection 105 approximately halfway down the steps. It will be appreciated that the arrangement of actuators and linkages may vary depending on the form and application of the steps, though the present invention remains unchanged.

Figure 6C:
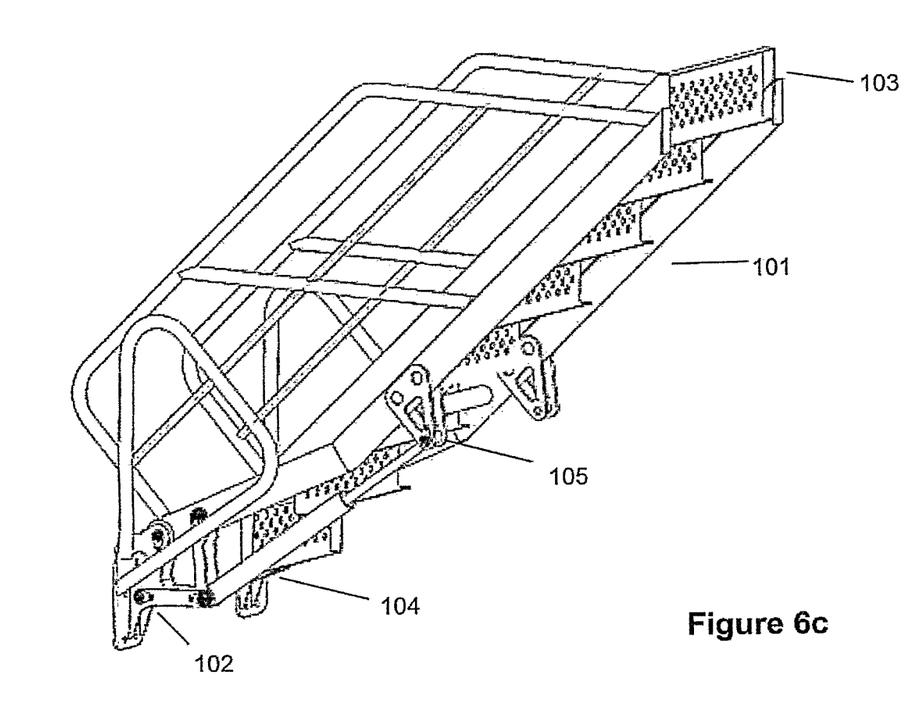

FIG. 6c shows the steps at approximately two thirds retracted. Consequently, the steps are, in this embodiment, considered sufficiently retracted as to be generally out of reach of personnel on the ground or that personnel on the vehicle/steps have had sufficient time (warning) of retraction of the steps and therefore are deemed either clear of the steps or have had sufficient time to apply force during the initial retraction phase to halt retraction or to manually cause the steps to re-deploy by overcoming the applied lift torque.

Figure 6D:
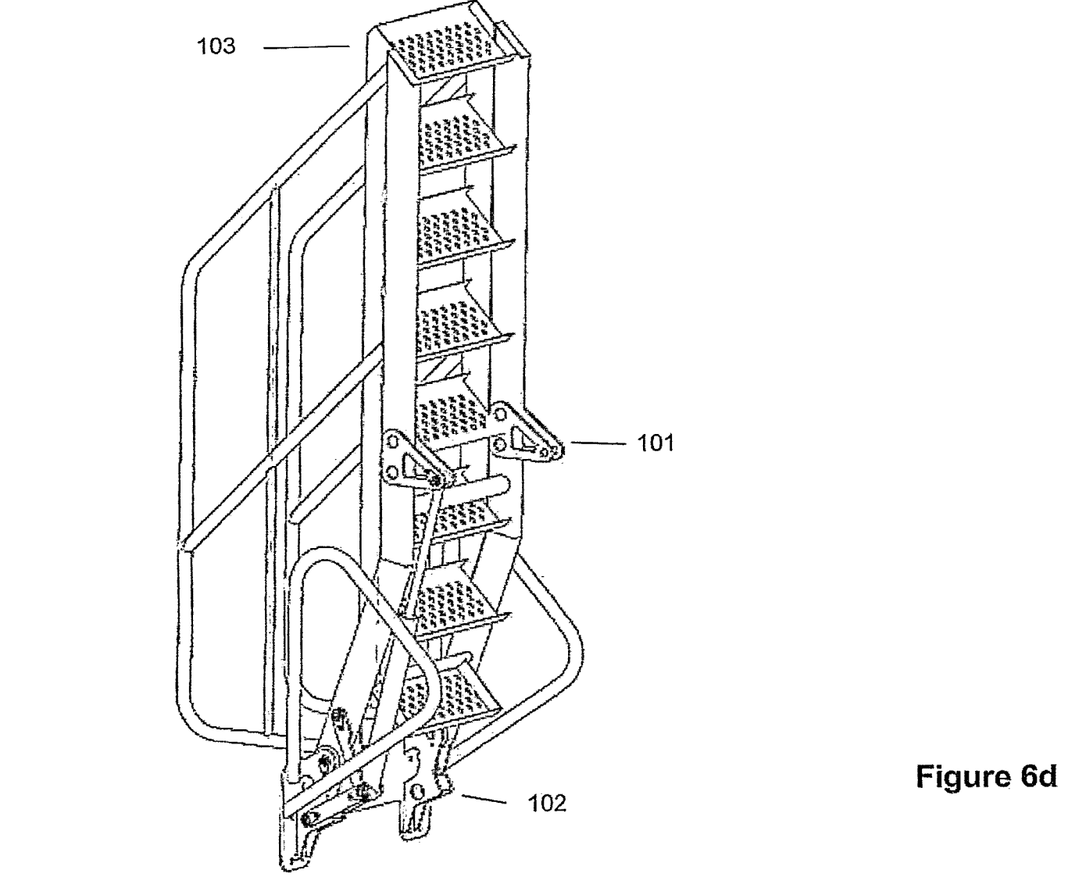

FIG. 6d shows the steps fully (vertically) retracted. Between phases 6c and 6d, torque applied to the steps increases, thereby diverging the applied lift torque curve away from the required lift torque curve. Force applied at the fully retracted position is sufficient to prevent or mitigate ladder/step bounce, thereby reducing risk of damage, injury or vehicle failure (eg due to bounce causing a proximity switch to inadvertently operate).

While the method and apparatus has been explained by illustrative examples it will be appreciated by those skilled in the art that varying embodiments and applications are within the teaching and scope of the present invention. The examples presented here in are by way of example and should not be construed as limiting the scope of the present invention.

The invention claimed is:

1. A vehicle access system comprising:
an access device mounted to a vehicle by an access device main pivot; and
a retraction mechanism including an actuator and a linkage arrangement, the actuator including a hydraulic ram connected between the access device and the linkage arrangement,
the hydraulic ram having a first end connected to the access device at a position spaced along the access device between the access device main pivot and a distal end of the access device, and
the linkage arrangement having:
a first linkage connected between a second end of the hydraulic ram and a first linkage pivot on the access device, and extending from the second end of the hydraulic ram to an intermediate pivot located on the access device at a position between the main pivot and the connection of the first end of the hydraulic ram, and
a second linkage connected between the hydraulic ram and a second linkage pivot mounted to the vehicle, and extending from the second end of the hydraulic ram to a body pivot point located on the vehicle to which the access device is mounted at a position offset from the access device main pivot.

2. A system as claimed in claim 1, wherein the access device includes at least one of stairs, steps or a ladder.

3. A system as claimed in claim 1, further including at least one of a hydraulic pilot control circuit or a handbrake hydraulic circuit of a vehicle to which the access device and the retraction mechanism are mounted, wherein the retraction mechanism is connected to the at least one of a hydraulic pilot control circuit or the handbrake hydraulic circuit of the vehicle to operate the hydraulic ram.

4. A system as claimed in claim 1, wherein the first end of the hydraulic ram is pivotally connected to the access device by a mounting bracket provided at the position spaced along the access device from the first pivot.

5. A system as claimed in claim 4, wherein the mounting bracket offsets the pivot connection of the first end of the actuator from the access device.

6. A system as claimed in claim 4, wherein the mounting bracket extends outward from the access device at an underside thereof.

7. A method of retracting a deployed stair or ladder pivotally mounted to a vehicle, the method including the steps of:
operating a retraction mechanism including an actuator and connected linkage arrangement to apply a first retraction torque to the deployed stair or ladder during an initial portion of a retraction phase of the deployed stair or ladder, the applied first retraction torque being equal to or greater than a minimum torque required to rotate the stair or ladder;
subsequently operating the retraction mechanism by applying a continuing retraction torque during a secondary portion of the retraction phase of the deployed stair or ladder, the continuing retraction torque providing an increasing amount of continuing retraction torque relative to the minimum torque required to rotate the stair or ladder during at least part of the retraction from a partially retracted position to a fully retracted position; and
wherein the actuator includes a hydraulic ram, the hydraulic ram has a first end pivotally connected to the deployed stair or ladder by a mounting bracket spaced from the first pivot, and a second end connected to the linkage arrangement, said arrangement including a first linkage extending from the second end of the ram to an intermediate pivot located on the stair or ladder at a position between the first pivot and the mounting bracket and a second linkage extending from the second end of the hydraulic ram to a body pivot point located on the vehicle to which the stair or ladder is mounted at a position offset from the stair or ladder first pivot.

8. A method as claimed in claim 7, wherein the first retraction torque differs from the minimum torque required to rotate the stair or ladder for retraction by an amount of torque less than a manual effort required to retard retraction of the deployed stair or ladder.

9. A method as claimed in claim 8, wherein the manual effort is sufficient to reverse retraction of the deployed stair or ladder and commence re-deployment thereof.

10. A method as claimed in claim 7, wherein the initial portion of the retraction phase is about two thirds of the entire retraction phase from commencement to fully retracted.

11. The method of claim 7, wherein operating the retraction mechanism to apply the first retraction torque and the increasing retraction torque includes using the connected linkage arrangement to translate a linear force to said increasing amount of the continuing retraction torque.

12. A method as claimed in claim 7, wherein the mounting bracket offsets the pivot connection of the first end of the hydraulic ram from the stair or ladder.

13. A method as claimed in claim 7, wherein the mounting bracket extends outward from the stair or ladder at an underside thereof.

14. A method of retracting an access device, the method including the steps of:
a) operating an actuating ram and a linkage arrangement of a retraction mechanism to apply a non-linear retraction torque using a linear force applied by the ram via the linkage arrangement to the access device during an initial portion of a retraction phase about a pivot axis of a first pivot of said access device when the access device is deployed, the non-linear retraction torque during this initial portion of the retraction phase being equal to or greater than a minimum torque required to lift the access device;

b) further operating the actuating ram and thereby the linkage arrangement of the retraction mechanism to apply a subsequent non-linear increasing retraction torque, by using the linkage arrangement to translate the applied linear force to the non-linear increasing retraction torque, during at least part of a secondary portion of the retraction phase of the deployed access device, after the initial portion of the retraction phase, the second retraction torque providing an increasingly greater difference in torque over the non-linear torque used to initially lift the access device;

c) maintaining the actuating ram and the linkage arrangement of the retraction mechanism in an operated position once the access device is in a retracted position, by using the linkage arrangement to translate the applied force to a retraction torque exerted on the retracted access device that is increased greater than the first non-linear retraction torque to mitigate movement of the access device about the first pivot axis; and wherein the actuating ram includes a hydraulic ram, the hydraulic ram has a first end pivotally connected to the access device by a mount spaced from the first pivot, and a second end connected to the linkage arrangement, said linkage arrangement including a first linkage extending from the second end of the ram to an intermediate pivot located on the access device at a position between the first pivot and the mount, and a second linkage extending from the second end of the hydraulic ram to a body pivot point, to which the access device is mounted at a position offset from the access device first pivot.

15. A method as claimed in claim 14, wherein the initial portion of the retraction phase is about two thirds of the entire retraction phase from commencement of the retraction phase to a position at which the access device is fully retracted.

16. A method as claimed in claim 14, the initial portion of the retraction phase being about two thirds of the entire retraction phase from commencement to fully retracted.

17. A method of retracting an access device mounted to a vehicle by operating a retraction mechanism including an actuator and a linkage arrangement, the actuator being connected to the linkage arrangement and the linkage arrangement being connected to the access device, by implementing the linkage arrangement with the actuator to translate a fixed applied force from the actuator as a non-linear torque to the access device to rotate the access device in an arc about a pivot axis of a first pivot to retract the access device from a fully deployed position to a retracted position, by applying a first amount of torque to the access device during an initial phase of retraction from the fully deployed position to a partially retracted position, the first amount of torque being equal to or greater than a minimum amount of torque required to rotate the access device upwards, and applying an increasing second amount of torque that increases over time and produces a greater difference over the first amount of torque as the access device is retracting from the partially retracted position to a fully-retracted position, and maintaining the second torque at an increased amount of torque greater than a torque required to hold the access device securely in a retracted position, wherein the actuator includes a hydraulic ram having a first end pivotally connected at a position spaced along the access device from the first pivot, and a second end connected to the linkage arrangement, wherein applying the fixed force includes using the hydraulic ram to apply the fixed force, and the linkage arrangement includes a first linkage extending from the second end of the hydraulic ram to an intermediate pivot located on the access device at a position between the first pivot and the connection of the first end of the hydraulic ram to the access device, and a second linkage extending from the second end of the hydraulic ram to a body pivot point located on a vehicle to which the access device is mounted at a position offset from the first pivot.

18. A method as claimed in claim 17, the initial phase of retraction being about two thirds of the entire retraction phase from commencement to fully retracted.

19. A method as claimed in claim 17, wherein the first end of the hydraulic ram is pivotally connected to a mounting bracket at the position spaced along the access device from the first pivot.

20. A method as claimed in claim 19, wherein the mounting bracket offsets the pivot connection of the first end of the hydraulic ram from the access device.

21. A method as claimed in claim 19, wherein the mounting bracket extends outward from the access device at an underside thereof.

* * * * *